US009952683B1

(12) United States Patent
Hamburgen et al.

(10) Patent No.: US 9,952,683 B1
(45) Date of Patent: Apr. 24, 2018

(54) KEYBOARD INTEGRATED WITH TRACKPAD

(71) Applicant: GOOGLE INC., Mountain View, CA (US)

(72) Inventors: William Hamburgen, Palo Alto, CA (US); Glen Murphy, Palo Alto, CA (US); Andrew Bowers, Mountain View, CA (US); Ji Lee, Sunnyvale, CA (US); Kevin Tom, San Francisco, CA (US); John Nicholas Jitkoff, Palo Alto, CA (US); Amy Han, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/810,086

(22) Filed: Jul. 27, 2015

Related U.S. Application Data (63) Continuation of application No. 14/303,062, filed on Jun. 12, 2014, now Pat. No. 9,092,068, which is a continuation of application No. 12/973,577, filed on Dec. 20, 2010, now Pat. No. 8,754,854.

(60) Provisional application No. 61/387,290, filed on Sep. 28, 2010.

(51) Int. Cl.
  *G06F 3/02* (2006.01)
  *G06F 3/044* (2006.01)
  *G06F 3/023* (2006.01)
  *G06F 3/047* (2006.01)

(52) U.S. Cl.
  CPC .......... *G06F 3/0213* (2013.01); *G06F 3/0238* (2013.01); *G06F 3/044* (2013.01); *G06F 3/047* (2013.01); *G06F 2203/04104* (2013.01)

(58) Field of Classification Search
  CPC ...... G06F 3/04886; G06F 3/041; G06F 3/044; G06F 3/0485; G06F 3/0238; G06F 3/0213; G06F 3/023; G06F 3/047; G06F 3/03547; G06F 2203/04104; H03K 17/9622; H03K 17/96; H03K 17/9629
  USPC .......................... 345/168–174; 341/22, 33; 178/18.01–18.06; 715/863
  See application file for complete search history.

(56) References Cited

U.S. PATENT DOCUMENTS

| 5,543,588 | A | 8/1996 | Bisset et al. |
| 5,666,113 | A * | 9/1997 | Logan .................. G06F 3/0488 341/22 |
| 5,729,219 | A | 3/1998 | Armstrong et al. |
| 5,847,690 | A | 12/1998 | Boie et al. |
| 6,483,498 | B1 | 11/2002 | Colgan et al. |

(Continued)

FOREIGN PATENT DOCUMENTS

| GB | 2445178 A | 7/2008 |
| WO | 2011/156447 A1 | 12/2011 |
| WO | 2014/052743 A1 | 4/2014 |

OTHER PUBLICATIONS

Non Final Office Action received for U.S. Appl. No. 12/973,577, dated Jan. 24, 2013, 17 pages.

(Continued)

*Primary Examiner* — Hong Zhou
(74) *Attorney, Agent, or Firm* — Brake Hughes Bellermann LLP (57) ABSTRACT

An apparatus includes a processor and a keyboard having multiple, separately moveable keys. The keyboard is configured to function as both a keyboard and a trackpad.

22 Claims, 7 Drawing Sheets

(56) References Cited

U.S. PATENT DOCUMENTS

| | | | |
|---|---|---|---|
| 8,098,233 | B2 | 1/2012 | Hotelling et al. |
| 8,274,494 | B2 | 9/2012 | Frey et al. |
| 8,432,362 | B2 | 4/2013 | Cheng et al. |
| 8,754,854 | B1 | 6/2014 | Hamburgen et al. |
| 9,092,068 | B1 | 7/2015 | Hamburgen et al. |
| 2002/0049070 | A1* | 4/2002 | Bick .............. G06F 3/0202 455/550.1 |
| 2004/0240924 | A1 | 12/2004 | Ye |
| 2005/0140661 | A1 | 6/2005 | Collins |
| 2006/0026536 | A1 | 2/2006 | Hotelling et al. |
| 2006/0197753 | A1 | 9/2006 | Hotelling |
| 2007/0240044 | A1 | 10/2007 | Fux et al. |
| 2007/0247431 | A1 | 10/2007 | Skillman et al. |
| 2008/0048990 | A1 | 2/2008 | Cho et al. |
| 2008/0084387 | A1 | 4/2008 | McArdle |
| 2008/0158145 | A1 | 7/2008 | Westerman |
| 2008/0266143 | A1 | 10/2008 | Ohshita et al. |
| 2008/0280658 | A1 | 11/2008 | Clemens |
| 2009/0046065 | A1 | 2/2009 | Liu et al. |
| 2009/0219257 | A1 | 9/2009 | Frey et al. |
| 2009/0322687 | A1 | 12/2009 | Duncan et al. |
| 2010/0053087 | A1 | 3/2010 | Dai et al. |
| 2010/0164880 | A1 | 7/2010 | Huang et al. |
| 2010/0194682 | A1* | 8/2010 | Orr .............. G06F 3/04886 345/156 |
| 2011/0018556 | A1 | 1/2011 | Le et al. |
| 2011/0134071 | A1 | 6/2011 | Kim et al. |
| 2011/0187655 | A1 | 8/2011 | Min et al. |
| 2011/0193813 | A1 | 8/2011 | Gralewski et al. |
| 2011/0273396 | A1 | 11/2011 | Chung |
| 2012/0038583 | A1 | 2/2012 | Westhues et al. |
| 2012/0218210 | A1 | 8/2012 | DeCaro et al. |
| 2012/0218221 | A1 | 8/2012 | Igeta |
| 2012/0235949 | A1 | 9/2012 | Ligtenberg |
| 2013/0038572 | A1 | 2/2013 | Frey et al. |
| 2013/0063391 | A1 | 3/2013 | Kang et al. |
| 2013/0155001 | A1 | 6/2013 | Yilmaz et al. |
| 2014/0085254 | A1 | 3/2014 | Tenuta et al. |

OTHER PUBLICATIONS

Response to Non Final Office Action for U.S. Appl. No. 12/973,577, filed Apr. 17, 2013, 11 pages.
Final Office Action received for U.S. Appl. No. 12/973,577, dated Jun. 13, 2013, 22 pages.
Response to Final Office Action for U.S. Appl. No. 12/973,577, filed Aug. 13, 2013, 17 pages.
Advisory Action received for U.S. Appl. No. 12/973,577, dated Aug. 27, 2013, 3 pages.
Non Final Office Action received for U.S. Appl. No. 12/973,577, dated Sep. 27, 2013, 15 pages.
Response to Non Final Office Action for U.S. Appl. No. 12/973,577, filed Jan. 27, 2014, 13 pages.
Notice of Allowance received for U.S. Appl. No. 12/973,577, dated Feb. 6, 2014, 5 pages.
Non Final Office Action received for U.S. Appl. No. 14/303,062, dated Oct. 2, 2014, 15 pages.
Response to Non-Final Office Action for U.S. Appl. No. 14/303,062, filed Feb. 2, 2015, 10 pages.
Notice of Allowance received for U.S. Appl. No. 14/303,062, dated Mar. 13, 2015, 5 pages.
Restriction Requirement Received for U.S. Appl. No. 14/101,866, dated Mar. 13, 2014, 6 pages.
Response to Restriction Requirement for U.S. Appl. No. 14/101,866, filed Apr. 25, 2014, 6 pages.
Non-Final Office Action received for U.S. Appl. No. 14/101,866, dated May 28, 2014, 10 pages.
Response to Non-Final Office Action for U.S. Appl. No. 14/101,866, filed Aug. 21, 2014, 9 pages.
Final Office Action received for U.S. Appl. No. 14/101,866, dated Oct. 24, 2014, 15 pages.
Response to Final Office Action received for U.S. Appl. No. 14/101,866, filed Dec. 23, 2014, 10 pages.
Advisory Action received for U.S. Appl. No. 14/101,866, dated Jan. 12, 2015, 3 pages.
Non Final Office Action for U.S. Appl. No. 13/073,514, dated Sep. 21, 2012, 11 pages.
Response to Non Final Office Action for U.S. Appl. No. 13/073,514, filed Jan. 22, 2013, 8 pages.
Final Office Action for U.S. Appl. No. 13/073,514, dated Jul. 3, 2013, 12 pages.
Response to Final Office Action for U.S. Appl. No. 13/073,514, filed Sep. 3, 2013, 10 pages.
Advisory Action received for U.S. Appl. No. 13/073,514, dated Sep. 13, 2013, 2 pages.
Advisory Action received for U.S. Appl. No. 13/073,514, dated Jan. 6, 2014, 3 pages.
Non Final Office Action for U.S. Appl. No. 13/073,514, dated Jan. 17, 2014, 11 pages.
Response to Non-Final Office Action for U.S. Appl. No. 13/073,514, filed Apr. 17, 2014, 10 pages.
Final Office Action for U.S. Appl. No. 13/073,514, dated Aug. 14, 2014, 13 pages.
Response to Final Office Action for U.S. Appl. No. 13/073,514, filed Dec. 15, 2014, 12 pages.
Notice of Allowance received for U.S. Appl. No. 13/073,514, dated Dec. 26, 2014, 9 pages.
Blasko et al., "Single-Handed Interaction Techniques for Multiple Pressure-Sensitive Strips", Extended Abstracts of the Conference on Human Factors in Computing Systems (CHI 2004), Apr. 24-29, 2004, pp. 1461-1464.
Buxton et al., "Issues and Techniques in Touch-Sensitive Tablet Input", Computer Systems Research Institute, vol. 19, No. 3, 1985, pp. 215-224., 1985, pp. 215-224.

* cited by examiner

KEYBOARD INTEGRATED WITH TRACKPAD

CROSS REFERENCE TO RELATED APPLICATIONS

This application is a continuation application of Ser. No. 14/303,062, filed Jun. 12, 2014, entitled "Keyboard Integrated with Trackpad", which is a continuation application of U.S. application Ser. No. 12/973,577, filed Dec. 20, 2010, now U.S. Pat. No. 8,754,854, entitled "Keyboard Integrated With Trackpad," which claims the benefit of U.S. Provisional Application No. 61/387,290, filed Sep. 28, 2010, entitled "Keyboard Integrated With Trackpad," both of which are hereby incorporated by reference in their entirety.

TECHNICAL FIELD

This description relates to acquiring user input for computing devices.

BACKGROUND

Computing devices typically use user input to perform desired computing tasks. User input can be supplied in various forms. Typically, user input comes either in the form of characters such as, for example, letters, numbers or other characters entered by typing on a keyboard, or in the form of touch input gestures such as, for example, scrolling cursor movements, clicks and other gestures entered by touching a trackpad, moving a mouse, or interacting with another touch- or motion-sensitive device or area.

Computing devices often include at least two distinct means of gathering these two primary forms of user input: For example, a portable computer may include both a keyboard and a trackpad, in addition to its display, processor and other hardware. The keyboard is configured for character entry and to perform shortcut commands via keystroke. The trackpad is configured to control cursor movement, and for scrolling, selecting items, and inputting other control gestures. Other touch devices, such as an external mouse, can in some cases be connected to the computer to duplicate or to supplement trackpad function; however, it may be typical to interact with portable computers primarily via the included trackpad.

Computers, particularly portable computing devices, have decreased dramatically in size in recent years. As such, space is at a premium and efficient allocation of space on device surfaces is increasingly important.

To operate software on a portable computer, a user generally interacts with both the keyboard and the trackpad. Normal typing on the keyboard typically occupies both of the user's hands, and using the trackpad requires the use of at least one hand.

The keyboard includes a plurality of keys, representing letters (e.g., Q, W, E, R, T, Y), numbers (e.g., 1, 2, 3), characters and symbols (e.g., Space, #, $, %) and functions (e.g. Ctrl, Esc, Shift). The spacebar key is typically positioned at the bottom center of the keyboard area, and its normal function during typing is to insert a blank space character, for example, to delineate boundaries between words.

The trackpad is a touch-sensitive surface on which the user can enter input. For example, depending on the computing context, the user may tap one or more fingertips on the surface of the trackpad, or place one or more fingertips on the surface and drag them in a particular pattern. The trackpad also may have separate buttons duplicating the clickable buttons on a mouse, or it may be clickable anywhere on its surface, or both. Other names for the trackpad include, for example, the touchpad, the track pad, and the touch pad.

Many computing applications may require the user to use both the keyboard and the trackpad, often switching rapidly between them. For example, in a word processing application, the user may type to enter text using the keyboard, and then wish to insert text into an earlier passage in the document. Using the trackpad, the user could scroll the cursor to the desired location in the document and click to position the cursor. The user could then switch to the keyboard and type the desired text, before scrolling back to the original position using the trackpad, clicking, and continuing to type. Such parallel use of trackpad and keyboard is common in many computing applications, such as, for example, web browsing, spreadsheets, word processing, e-mail programs, presentation managers, and photo and video editing software.

SUMMARY

In one general aspect, an apparatus includes a processor and a keyboard having a plurality of separately moveable keys. The keyboard is configured to function as both a keyboard and a trackpad.

Implementations may include one or more of the following features. For example, the keyboard may be configured to detect touch gestures made on or near a surface of the keyboard and the processor may be configured to process the touch gestures into one or more actions. The keyboard may include one or more touch sensors configured to detect touch gestures made on or near a surface of the keyboard and the processor may be configured to process the touch gestures detected by the touch sensors into one or more actions. In one implementation, the touch sensor may include a plurality of individual touch-sensitive conduits arranged across each of the separately movable keys.

The keyboard may include a separate sensor array configured to detect touch gestures made on or near a surface of the keyboard and the processor may be configured to process the touch gestures detected by the separate sensor array into one or more actions. The keyboard may be configured to detect touch gestures made on or near a surface of the keyboard and the processor may be configured to classify the touch gestures between a typing gesture, a click gesture and a tracking gesture. The separately moveable keys may be individual keys. The individual keys may be arranged such that each of the keys is an approximately planar surface arranged together to cover a substantial portion of a key support. The individual keys may each include a key surface, a touch-sensor layer and a support. The touch-sensor layer may include a capacitive surface, which may include multiple individual touch-sensitive conduits arranged across each individual key.

The apparatus may include a spring mechanism for each separately movable key. The apparatus may include a keystroke sensor for each separately movable key. The apparatus may include a force sensor for each separately movable key.

In another general aspect, a method includes executing instructions recorded on a non-transitory computer-readable storage media using at least one processor. The method includes obtaining an input to a keyboard, where the keyboard includes a plurality of separately movable keys and the keyboard is configured to function as both a keyboard and a trackpad. The method includes determining a context of the keyboard input and characterizing the keyboard input as one of a typing gesture, a click gesture or a tracking gesture.

Implementations may include one or more of the following features. For example, determining the context of the keyboard input may include determining whether the keyboard input included input to one or more than one key. Determining the context of the keyboard input may include determining whether the keyboard input was a tapping movement or a sliding movement. Determining whether the keyboard input was a tapping movement or a sliding movement may include determining whether the tapping movement was a typing gesture or a click gesture. Determining the context of the keyboard input may include determining whether the keyboard input activated a sensor in one of the separately moveable keys. Determining the context of the keyboard input may include determining an application context of the keyboard input. Determining the context of the keyboard input may include determining a text entry context of the keyboard input. Determining the context of the keyboard input may include determining a duration of the keyboard input.

In another general aspect, a recordable storage medium has recorded and stored thereon instructions that, when executed, perform the actions of obtaining an input to a keyboard, where the keyboard includes a plurality of separately movable keys and the keyboard is configured to function as both a keyboard and a trackpad, determining a context of the keyboard input and characterizing the keyboard input as one of a typing gesture, a click gesture or a tracking gesture.

Implementations may include one or more of the following features. For example the instructions that, when executed, perform the action of determining the context of the keyboard input may include instructions that, when executed, perform the action of determining whether the keyboard input included input to one or more than one key. The instructions that, when executed, perform the action of determining the context of the keyboard input may include instructions that, when executed, perform the action of determining whether the keyboard input was a tapping movement or a sliding movement. The instructions that, when executed, perform the action of determining whether the keyboard input was a tapping movement or a sliding movement may include instructions that, when executed, perform the action of determining whether the tapping movement was a typing gesture or a click gesture. The instructions that, when executed, perform the action of determining the context of the keyboard input may include instructions that, when executed, perform the action of determining whether the keyboard input activated a sensor in one of the separately movable keys. The instructions that, when executed, perform the action of determining the context of the keyboard input may include instructions that, when executed, perform the action of determining an application context of the keyboard input. The instructions that, when executed, perform the action of determining the context of the keyboard input may include instructions that, when executed, perform the action of determining a text entry context of the keyboard input. The instructions that, when executed, perform the action of determining the context of the keyboard input may include instructions that, when executed, perform the action of determining a duration of the keyboard input.

The details of one or more implementations are set forth in the accompanying drawings and the description below. Other features will be apparent from the description and drawings, and from the claims.

DETAILED DESCRIPTION

Figure 1A:
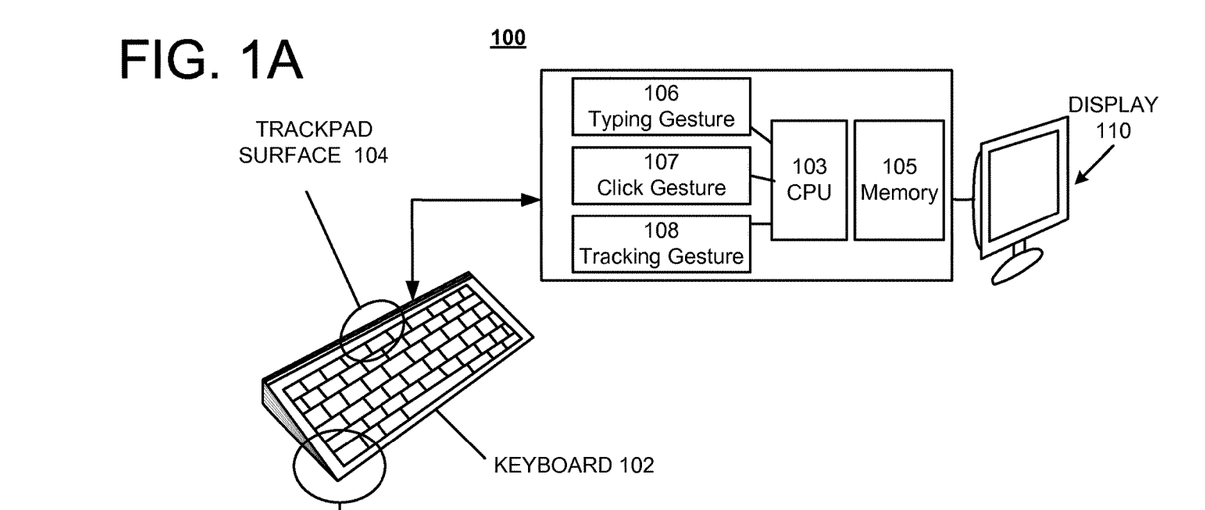
FIG. 1A is an exemplary block diagram of a system for acquiring user input for a computing device by means of a keyboard whose surface is configured to function as both a keyboard and a trackpad.

FIG. 1A is a block diagram of a system 100 for acquiring user input for a computing device by means of a keyboard 102, the surface of which is configured to function as both a trackpad surface 104 and a keyboard 102. In FIG. 1A, the system 100 integrates the trackpad surface 104 with the keyboard 102, such that one or more of the keys or all keys can also function as a trackpad. Merging the keyboard and trackpad into a single area is space-efficient, and moreover saves effort on the part of the user by, for example, obviating the need to physically move between the keyboard and the trackpad.

The system 100 includes a keyboard 102. In one exemplary implementation, the keyboard 102 includes multiple, separately movable keys. The keyboard 102 may be used, for example, to enter text or characters in the context of a software application. For example, the keyboard 102 may be used to type words in a document in a word processing application.

The keyboard 102 includes a trackpad surface 104. The trackpad surface 104 may be configured to perform trackpad functions including, for example, controlling movement of a cursor on a display 110. For example, the trackpad surface 104 may be configured to scroll the cursor between icons on the display and to select an icon corresponding to a desired application. As a further example, once the cursor is positioned as desired by the user, the trackpad surface 104 may be used to click on icons or file names depicted on the display 110.

Because of its trackpad surface 104, the keyboard 102 may be configured, for example, both as a trackpad and as a keyboard. For example, a user may utilize the entire trackpad surface 104 for inputting different types of gestures. The different types of gestures may includes gestures that are in an X, Y and Z axis, including combinations of gestures which may be in multiple axis. The different types of gestures may include, for example, a typing gesture, a click gesture, and a tracking gesture using one or more fingertips. A typing gesture includes gestures input in a Z axis direction (e.g., into the keyboard 102), which are intended by the user to input a keystroke into the system 100 using a selected key on the keyboard 102. A click gesture includes gestures input in a Z axis direction (e.g., into the trackpad surface 104), which are intended by the user to input a selection input (e.g., a selection of an object or objects, copying, pasting, tapping, cutting and other click type functions) instead of a keystroke. A tracking gesture includes gestures input in the X axis and the Y axis and are intended by the user for actions such as, for example, cursor movement, sliding movement, and dragging movement. The entire keyboard 102 may function to receive any of these different types of gestures.

In the system depicted in FIG. 1A, the keyboard 102 and its trackpad surface 104 are connected to a central processing unit (CPU) 103 and to a memory 105. The CPU 103 may include one or more processors and may be configured to arbitrate and characterize the inputs into the keyboard 102. While the CPU 103 is illustrated as a single unit, the CPU 103 may include other more specific processing units including, for example, a keyboard processor module (not shown) and a trackpad processor module (not shown). The CPU 103 may be configured to perform system management, software program execution and to provide interfaces between system components.

The memory 105 may be configured to store instructions for execution by the processor 103, including operating system instructions, firmware and other instructions relating to the functioning of the keyboard 102 having a trackpad surface 104. In one exemplary implementation, the memory 105 also may be configured to function as a buffer to store information including past history related to input gestures.

In one exemplary implementation, the CPU 103 may be configured to receive gesture inputs including, for example, typing gestures 106, click gestures 107 and tracking gestures 108, as described above. The CPU 103 is configured to determine a context of the inputs to the keyboard 102 and to characterize the inputs as a typing gesture, a click gesture or a tracking gesture. The CPU 103 may function as an arbiter to determine the type of input and how to process the input.

In one exemplary implementation, the CPU 103 may interpret the input from the trackpad surface 104 to determine, for example, whether a given input should be classified as a typing gesture 106 (e.g., a keystroke) or a tracking gesture 108 (e.g., a trackpad input to move a cursor on the display 110). For example, a user striking an individual key region of the keyboard's 102 trackpad surface 104 with a fingertip might intend for the strike to be interpreted as a keystroke, or instead as a tap on the trackpad surface 104. In this implementation, the CPU 103 may interpret the input according to, for example, the computing context in which the user is operating, the force of the input over time, the history of how similar inputs have been characterized or corrected by the user, or characteristics of the user's input gesture, or by other means. Further, in this implementation, the CPU 103 may, for example, interpret a series of keystrokes input by the user, recognize the characters corresponding to the keys pressed, and transmit this string of characters to the display 110.

In another example, the user tapping an individual key region of the keyboard's 102 trackpad surface 104 with a fingertip might intend for the strike to be interpreted as a click gesture 107. In this example, the CPU 103 may interpret the input according to, for example, the computing context in which the user is operating, the force of the input over time, the history of how similar inputs have been characterized or corrected by the user, or characteristics of the user's input gesture, or by other means. In this example, the CPU 103 may process the gesture as a click gesture.

In one exemplary implementation, the CPU also may be configured to ignore or reject spurious inputs such as, for example, one or more fingers resting on the trackpad surface 104.

In one exemplary implementation, the CPU 103 may use past history and learning based on user corrections to characterized gestures to determine how to characterize an input gesture. For example, a history of input gestures may be stored in the memory 105. The history may include information such as the key or keys or region into which the input occurred, the force of the input and whether or not the user corrected an initial characterization of the input by the CPU 103. This information, as well as other related information, may be used by the CPU 103 to learn what gesture is intended by the user.

Figure 1B:
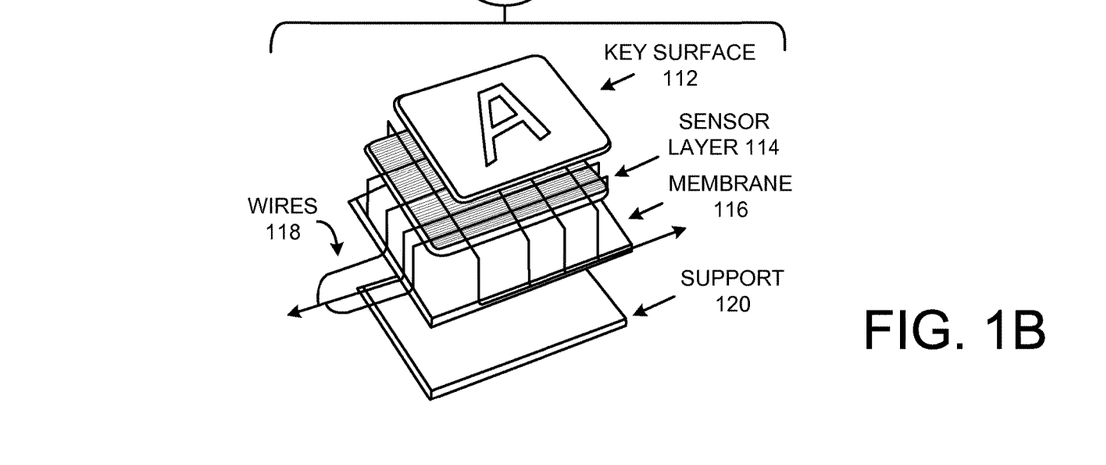
FIG. 1B is an exemplary block diagram illustrating a detailed view of an exemplary implementation of the system of FIG. 1A.

FIG. 1B depicts a cutaway view of a possible implementation of the system of FIG. 1A. In this implementation, the keyboard 102 includes multiple layers, including a key surface 112, a tracking layer 114, an optional membrane 116, wires 118, and a support 120. In one exemplary implementation, the key surface 112 includes separately movable keys.

In the example implementation shown in FIG. 1B, a key surface 112 includes the surface of the trackpad surface 104, and is the layer that the user touches in order to enter an input to the trackpad surface 104. For example, the user may tap the key surface 112 with a fingertip, or slide one or more fingertips across the key surface 112, or between multiple key surfaces 112 on adjacent keys. In this example implementation, the key surface 112 may be composed of glass, plastic, composite or any other material suitable for a trackpad surface 104.

In the same example implementation shown in FIG. 1B, a tracking layer 114 sits beneath the key surface 112, and may include wires 118 to carry signals corresponding to touch inputs provided by the user. The tracking layer 114 may be configured, for example, to capture user input applied to the key surface 112, and to convert the input to one or more signals to be used by the system (e.g., the CPU 103) in order to record, process and handle user input. Other implementations of the tracking layer 114 are possible, such as, for example, a tracking layer 114 not utilizing wires 118, but instead tracking user touch inputs by other means.

Wires 118, if present in the implementation, may be organized in a grid pattern as shown in the example implementation in FIG. 1B, or in another pattern suitable for capturing user input on the key surface 112. For example, wires 118 may also be oriented in a spiral pattern, a triangular or other regular grid pattern, an irregular grid pattern, or another pattern. In one exemplary implementation, a pad array or other type of array may be used.

The membrane 116, if present, may sit between the sensor layer 114 and the support 120. The membrane may be configured, for example, to cushion the impact of keystrokes on individual keys, and to act as a channel for wires 118 to run along the base of the keyboard 102. For example, an individual key may include a key surface 112, and beneath this a tracking layer 114, the wires 118 from which run down and are embedded in the membrane 116, which also serves to cushion keystrokes. The membrane may be composed of, for example, silicone or rubber.

The support 120, if present, may be a rigid support beneath the keyboard 102 upon or around which other layers are arranged. The support may be configured to offer structural rigidity to the keyboard 102, or to provide a resistant surface against which keystrokes can be made.

The system 100 may also include a display 110, which may be configured, for example, to display program information to the user and permit the user to interact visually with the system 100. For example, the display may depict the operating system desktop screen, or an active software window, to the user.

Figure 2A:
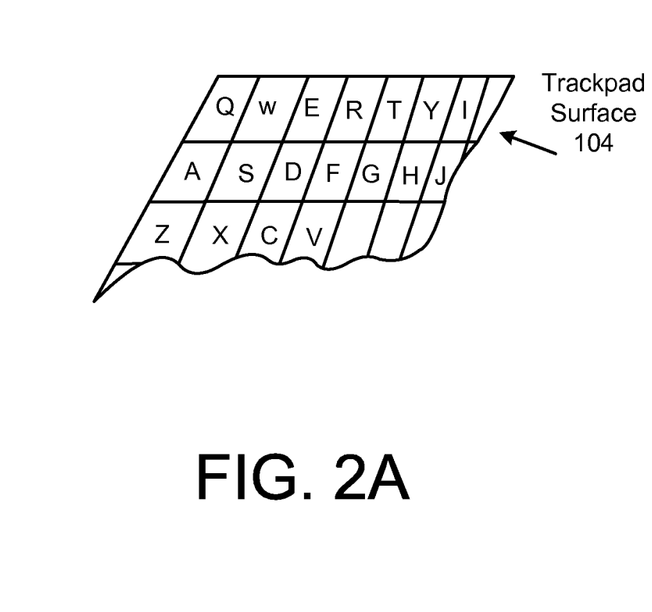
FIG. 2A and FIG. 2B are exemplary block diagrams illustrating exemplary implementations of the system of FIG. 1A.
Figure 2B:
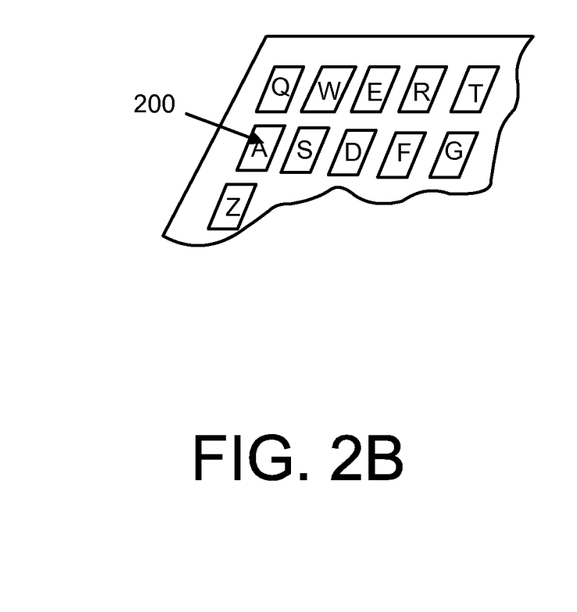

FIGS. 2A and 2B depict two exemplary implementations of the system of FIG. 1A. FIG. 2A depicts the keyboard 102 as consisting of a single trackpad surface 104 partitioned to represent individual keys. In this example implementation, the single trackpad surface 104 may be configured to function as a keyboard 102, for example, by assigning different regions of the single trackpad surface 104 to correspond to individual keys on the keyboard 102. For example, a user may type normally on the single trackpad surface 104, and depending upon which specific portion of the trackpad surface 104 was pressed, the typing may be interpreted as keystrokes corresponding to the applicable key assigned to each region of the trackpad surface 104 with which the user makes contact. For example, a user may type on a single trackpad surface, and have the input be recognized as a string of characters as though the user were typing on independent keys on a keyboard.

In this implementation, although the keyboard 102 is composed of a single sheet of trackpad surface 104, it may nonetheless include, for example, representations of regions corresponding to different keys, and the corresponding regions of the trackpad surface 104 may be mapped to correspond to the keys as indicated. For example, a user typing on this single trackpad surface 104 may see representations of individual keys on the trackpad surface (for example, Q, W, E, R, T, Y) and find his keystrokes recorded as though he were typing on a traditional keyboard with independent keys.

The representations of keys on the trackpad surface may be visual (for example, painted, projected, displayed or otherwise visually ascertainable depictions), tactile, or communicated to the user by other means.

FIG. 2B depicts the keyboard 102 as consisting of separate individual keys 200. In this example implementation, the keyboard 102 is comprised of separately, movable individual keys 200, each of which can be pressed or activated independently. The separate individual keys may be configured, for example, to activate only one key at a time, for example if a user presses the key marked "B", the keyboard may mechanically or electronically register the keystroke corresponding to the "B" key.

Figure 2C:
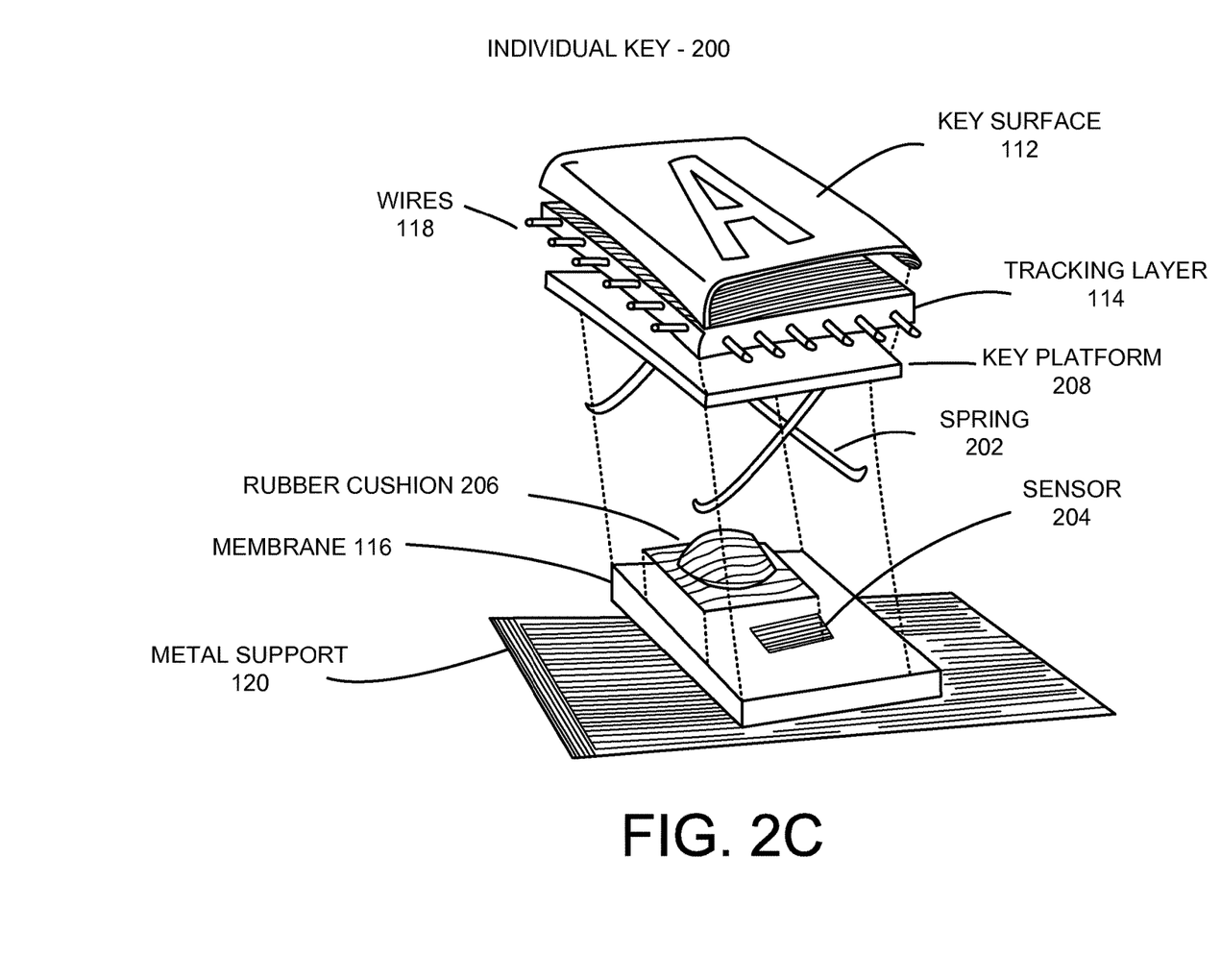
FIG. 2C is an exemplary block diagram illustrating an exemplary implementation of the system of FIG. 2B.

The separate individual keys 200 may be arranged so as to be flush with one another. For example, the keys may be arranged adjacent to one another so as to minimize the gap between them and to provide a near-uniform surface when, for example, a user slides his finger across the surface of adjacent keys. For example, the keys 200 may be arranged to FIG. 2C depicts an example implementation of the system of FIG. 2B, specifically depicting the structure of an individual key in the keyboard. In the example implementation shown in FIG. 2C, each individual key 200 includes a key surface 112. The key surface 112 includes the surface of the individual key 200, and is the layer that the user touches in order to enter an input to the portion of the trackpad surface 104 represented by this individual key 200. For example, the user may tap the key surface 112 with a fingertip, or slide one or more fingertips across the key surface 112, or between multiple key surfaces 112 on adjacent keys 200. In this example implementation, the key surface 112 may be composed of glass, plastic, composite or any other material suitable for a trackpad surface 104.

In the example implementation shown in FIG. 2C, each individual key 200 may include a tracking layer 114. Because in the system 100, the trackpad surface 104 extends over part or all of the keyboard 102, a plurality of individual keys or all individual keys may include distinct tracking layers 114. The tracking layers 114 on each individual key may be configured, for example, to track gestures and trackpad input within the surface of the individual key 200, or to track gestures and trackpad input across and between a plurality of individual keys 200. For example, a user may slide her finger across the key surface 112 of three adjacent independent keys 200, thereby triggering the tracking layers 114 of the three adjacent keys 200 to track her gesture across all three individual keys 200.

Wires 118, if present in the implementation, may be organized in a grid pattern as shown in the example implementation in FIG. 2C, or in another pattern suitable for capturing user input on the key surface 112. For example, wires 118 may also be oriented in a spiral pattern, a triangular or other regular grid pattern, an irregular grid pattern, or another pattern.

In the example implementation shown in FIG. 2C, each individual key 200 may include a spring assembly 202 and further may include a rubber cushion 206. The spring 202 and cushion 206 may be configured to, for example, provide tactile resistance when an individual key 200 is depressed, and to cushion the lower portion of the keystroke. For example, for a user typing on the keyboard 102, which in this implementation includes individual keys 200, each keystroke would be met with, for example, spring-like tactile resistance on each key 200, and a softened keystroke on account of the rubber cushion 206. The spring assembly 202 and rubber cushion 206, if present, may be mounted between the tracking layer 114 or the key platform 208, and the support 120.

In the example implementation shown in FIG. 2C, each individual key 200 may also include a key platform 208. The key platform 208 may be configured to, for example, support or suspend the key surface 112 and tracking layer 114 above the membrane 116 and the support 120.

In the example implementation shown in FIG. 2C, each individual key 200 may also include a sensor 204. The sensor 204 may record individual keystrokes by, for example, sending a signal when the top assembly of the individual key 200 is depressed and makes contact with the sensor 204. For example, a user typing on individual keys 200 would depress each key 200 sufficient to bring the upper assembly of the key 200 (comprising, in this implementation, the key surface 112, the tracking layer 114, and the key platform 208) into contact with the lower assembly of the key 200 (comprising, in this implementation, the rubber cushion 206, the membrane 116, and support 120), sufficient to trigger the sensor 204 under each key 200. The signal from the sensor 204 under each key may then transmit a signal corresponding to the appropriate keystroke, which could be sent, for example, to the CPU 103 or processed by other means.

In one exemplary implementation, the sensor 204 may use tactile sensing in combination with a displacement measurement of a key 200 to generate a signal with the measured amounts for transmission to the CPU 103 to determine how to characterize the gesture based on the measured information.

In this example implementation, then, the keyboard 102 includes multiple individual keys 200, where each individual key 200 may be equipped with a functional trackpad surface. Each key 200 can thus be used in several distinct ways. First, each key can be used as one would use a mechanical key on a traditional keyboard—that is, each can be activated by applying pressure to depress that individual key, thereby activating the sensor and triggering a typing gesture and the expected corresponding keystroke. Second, the surface of each key can be used as a small trackpad—that is, the user can tap lightly on the key surface without depressing the entire key assembly and triggering a keystroke, or the user can slide one or more fingertips across the key surface to input a tracking gesture or a click gesture instead of a typing gesture. Third, each key can contribute its surface area to a form a larger, virtual trackpad spanning multiple keys, or all keys on the keyboard.

Therefore, in this example implementation, when an individual key 200 is depressed sufficient to trigger the sensor 204, the associated keystroke is registered as a typing gesture. For example, a user typing normally on the keyboard would depress each individual key 200 sufficient to record the typing as keystrokes.

In this or other implementations, a keystroke or typing gesture may also be registered when an individual key 200 is tapped but not depressed sufficient to trigger the sensor 204, dependent on the context of the input. For example, a user typing lightly on the keys with insufficient force to depress any individual key sufficient to trigger its sensor may nonetheless register keystrokes for every key touched.

However, the surface of the individual keys also combines to generate a virtual trackpad surface 104 spanning some or all of the keyboard 102, and thereby permitting a user to employ the surface of the various keys as a single virtual trackpad surface 104 and to input click gestures and tracking gestures.

In one exemplary implementation, the sensor 204 may include a force sensor. The force sensor may detect and use an amount of force exerted by the user to generate a signal to provide as input to the CPU 103 of FIG. 1 such that the CPU 103 may characterize the input as either a typing gesture or a click gesture. In another exemplary implementation, force or pressure history may be used to distinguish between click gestures and typing gestures. A measure of the force over a period of time, as measured by the force sensor and stored in the memory 105, may be used to distinguish click gestures from typing gestures. For example, an input that merely touched an individual key 200 without meeting a threshold pressure or force level may be considered a click gesture. On the other hand, an input on an individual key 200 that met and/or exceeded a threshold pressure or force level may be considered a typing gesture.

FIGS. 3A-3D depict exemplary implementations of the system of FIG. 1A.

Figure 3A:
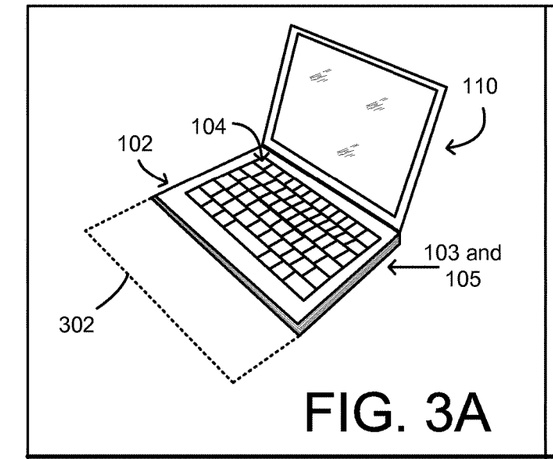
FIGS. 3A-3D are exemplary block diagrams of exemplary implementations of the system of FIG. 1A.

FIG. 3A depicts the system of FIG. 1A implemented in a portable computer, wherein the display 110, the CPU 103 and the memory 105 are all included within the portable device housing, along with the keyboard 102 with its trackpad surface 104. The dotted line 302 illustrates the space saved on the device by not needing a separate trackpad adjacent to the keyboard.

Figure 3B:
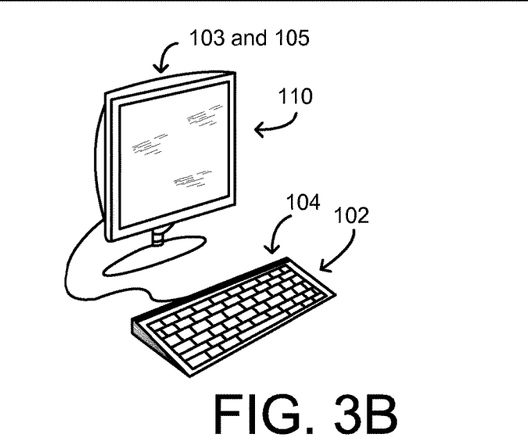

FIG. 3B depicts the system of FIG. 1A implemented in a desktop computer, wherein the display 110, the CPU 103 and the memory 105 are included within the desktop computer, and the keyboard 102 with its trackpad surface 104 is connected as an external peripheral. This connection may be wired (for example, with a USB or similar cable) or wireless (for example, with wireless radio, WiFi, infrared, Bluetooth or a similar connection). Note that the system does not require an external mouse or trackpad, because the trackpad functionality is integrated with the keyboard.

Figure 3C:
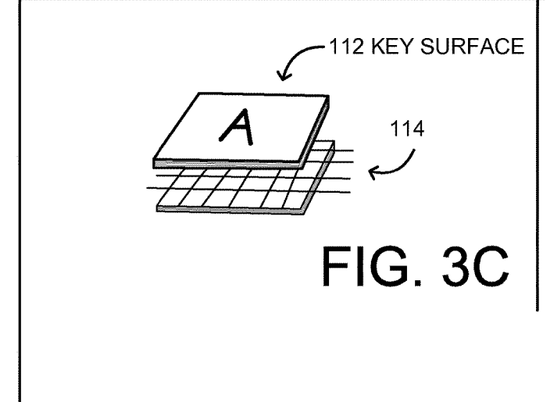

FIG. 3C depicts the system of FIG. 1A implemented by means of a tracking layer 114 underneath the key surface 112 of the keyboard 102 and trackpad surface 104. In this implementation, which has been previously described and is also illustrated in FIG. 1A, user input on the trackpad surface 104 is tracked—either across the entire trackpad surface 104, or across each individual key surface 112—by means of a tracking layer 114 at or below the surface. This implementation of the system of FIG. 1A may be configured to track user input to and across the keys, by means of registering gesture, including typing gestures, click gestures and tracking gestures made while in contact with the trackpad surface 104 or any individual key surface 112. For example, a user may slide her finger gently across the surface of a key, and this motion is registered by the tracking layer 114.

Figure 3D:
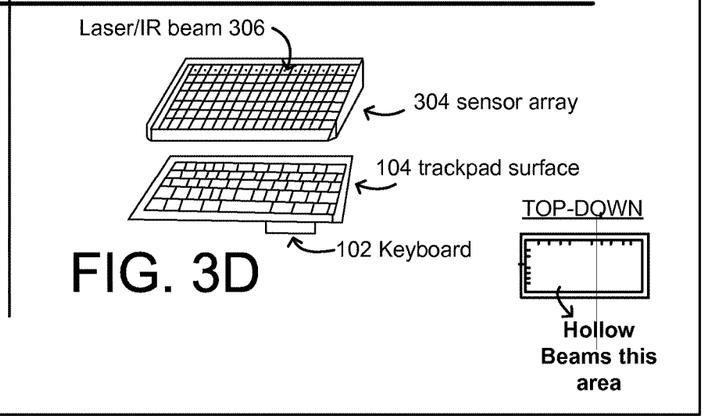

By comparison, FIG. 3D depicts the system of FIG. 1A implemented by means of a plurality of light beams 306 and a plurality of sensors arranged in a sensor array 304. The light beams and sensor array may be configured, for example, to track the location or movement of a user's hand or fingers on or near the keyboard's 102 trackpad surface 104. For example, a user may slide her finger gently across the surface of a key and this motion is registered by the light beams 306 and sensor array 304.

Figure 4A:
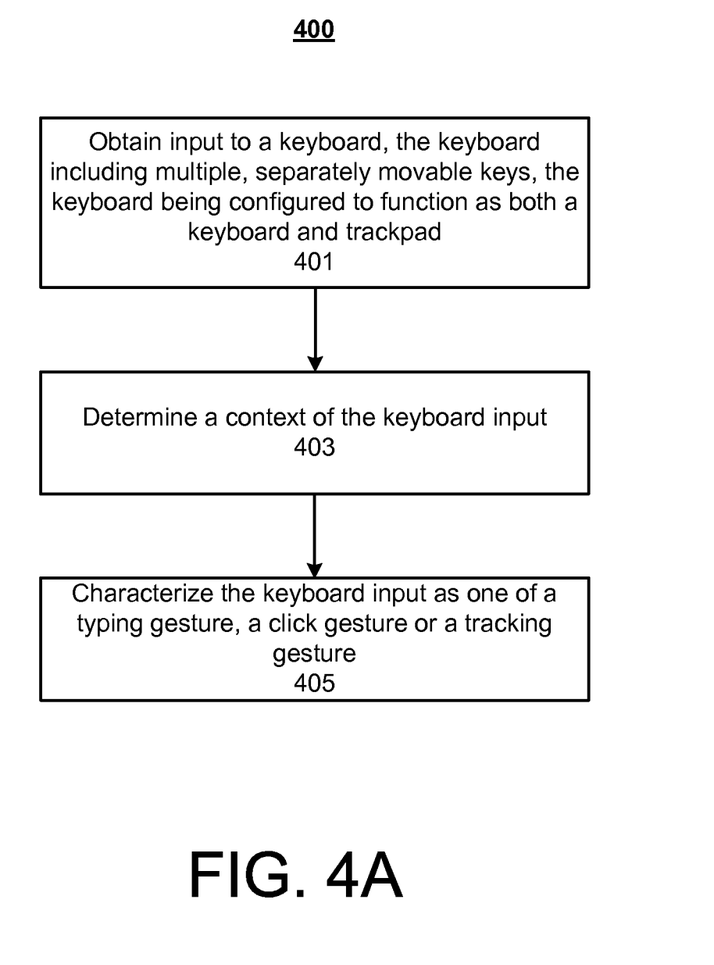
FIG. 4A is a flowchart illustrating example operations of the system of FIG. 1A.

FIG. 4A depicts a flowchart of a process 400, illustrating example operations of the system of FIG. 1A. This process 400 is an example embodiment of a process to handle user input to the combined keyboard 102 and trackpad surface 104.

Process 400 includes obtains input to the combined keyboard 102 and trackpad surface 104, where the keyboard includes multiple, separately movable keys (401), determining the context of the keyboard input (403) and characterizing the keyboard input as a typing gesture, a click gesture or a tracking gesture (405). Process 400 is described in more detail below with respect to FIG. 4B.

Figure 4B:
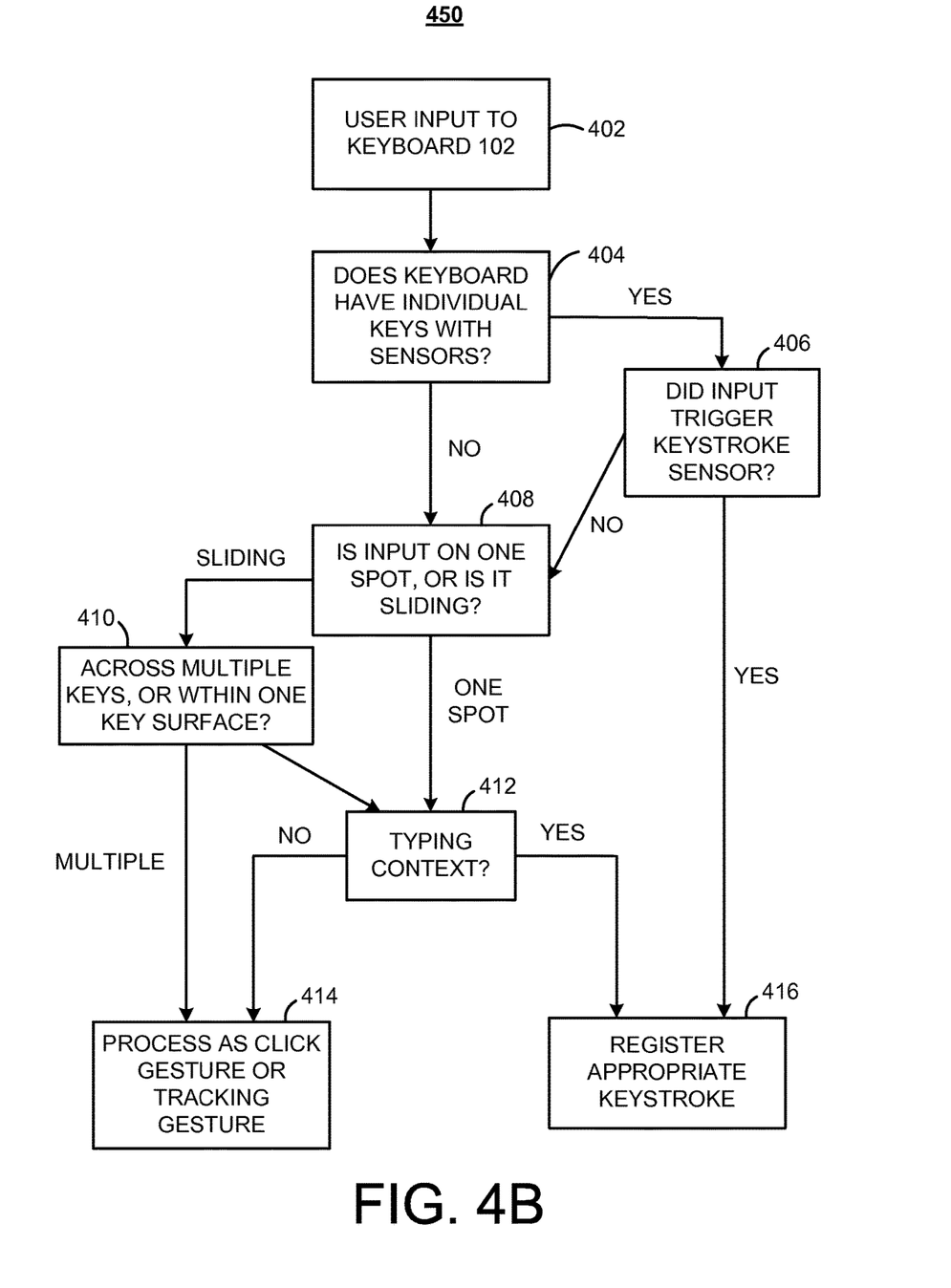
FIG. 4B is a flowchart illustrating example operations of the system of FIG. 1A, specifically an exemplary embodiment of the process shown in FIG. 4A.

FIG. 4B depicts a flowchart of an exemplary embodiment of the process 450, illustrating example operations of the system of FIG. 1A.

At step 402, the user of the system of FIG. 1A generates input on the combined keyboard 102 and trackpad surface 104. This input may be provided in the form of touching, tapping, pressing or other inputs to the surface of the keyboard 102 or trackpad surface 104 with a fingertip, or sliding one or more fingertips across the surface of the trackpad surface 104. For example, the user may tap the trackpad surface 104.

The process splits 404 according to whether the keyboard has individual keys. If, as depicted in FIG. 2B, the keyboard 102 has individual keys 200 with sensors 204, the process 450 determines 406 whether the input triggered a sensor 204 under an individual key 200. If the process 450 determines that the input did indeed trigger a sensor 204 under an individual key 200, the process 450 terminates 416 by registering the input as a typing gesture and sending the appropriate keystroke corresponding to the key 200 associated with the sensor 204 that registered the contact.

For example, a user typing on a keyboard with individual keys may strike, for example, the "A" key. By depressing this key sufficient to trigger its underlying sensor, the process 450 records the input as a typing gesture as a press of the "A" key and transmits this character on to the CPU 103 or other processor. In some exemplary implementations, the sensor may make the input characterization determination instead of the CPU 103.

If, on the other hand, the keyboard does not have individual keys 200—for example, if the keyboard is instead as depicted in FIG. 2A, namely a single surface with representations of individual keys—or, if at step 406 it is determined that a sensor was not activated, then the process 450 next determines 408 whether the input is localized to one discrete location on the trackpad surface 104, or whether it is a sliding or dragging input or otherwise occupies a larger area.

If the input is localized to a single spot, the process at step 412 determines whether the input occurs in a typing context. For example, a user who supplies the aforementioned input 402 to the trackpad surface 104 while typing a sentence in a word processing program may be operating in a typing context.

If the input occurs in a typing context, the process 450 terminates 416 by sending the appropriate keystroke associated with the key or region that registered the contact.

If, on the other hand, the input 402 is not in a typing context, or if, at step 410, the input is not localized to one spot, the process 450 terminates 414 by processing the input 402 as a tracking gesture or a click gesture.

Some simple cases will assist in illustrating the operation of this process 450.

In the first case, assume the system of FIG. 1A is implemented as shown in FIG. 2B, namely, with independent keys 200 each having a sensor 204 as well as a tracking layer 114 under the key surface 112. Further assume that a user places her fingertip gently on the surface of "F" key, and without depressing the F key or any other, slides her finger gently to the right, crossing the "G" and "H" keys before stopping at the "J" key.

In handling this first case, the process 450 would determine that the keyboard was arranged with independent keys 200 and sensors 204 under each, per step 404. However, at step 406 it would determine that no sensor had been triggered, and thus step 408 would determine whether the input was localized to one spot, or sliding. Since this input is sliding, involving four adjacent key surfaces, step 410 determines that multiple keys are involved. The process terminates 414 by returning the gesture as a tracking gesture. In this case, then, the user would have input a gesture equivalent to sliding her finger to the right on a traditional trackpad.

In the second case, assume the system of FIG. 1A is implemented as shown in FIG. 2A, namely, with a single trackpad surface 104. Further assume that a user, operating in a word processing program and following a string of text entry wherein she typed "PATEN", taps gently on the surface of "T" key and then removes her finger.

In handling this second case, the process 450 would determine that the keyboard was arranged a single trackpad surface 104 as opposed to independent keys, per step 404. Step 408 would determine that the input was localized to one spot, as opposed to sliding. Step 412 examines the context of the localized input. Here, the input occurred in a typing context (for example, because the localized tap followed a string of text entry, in a word processing program), and as such the process terminates 416 by returning the input as a typing gesture, namely a keystroke to the "T" key. In this case, then, the user would have input a gesture equivalent to depressing the "T" key on a traditional keyboard.

Figure 5:
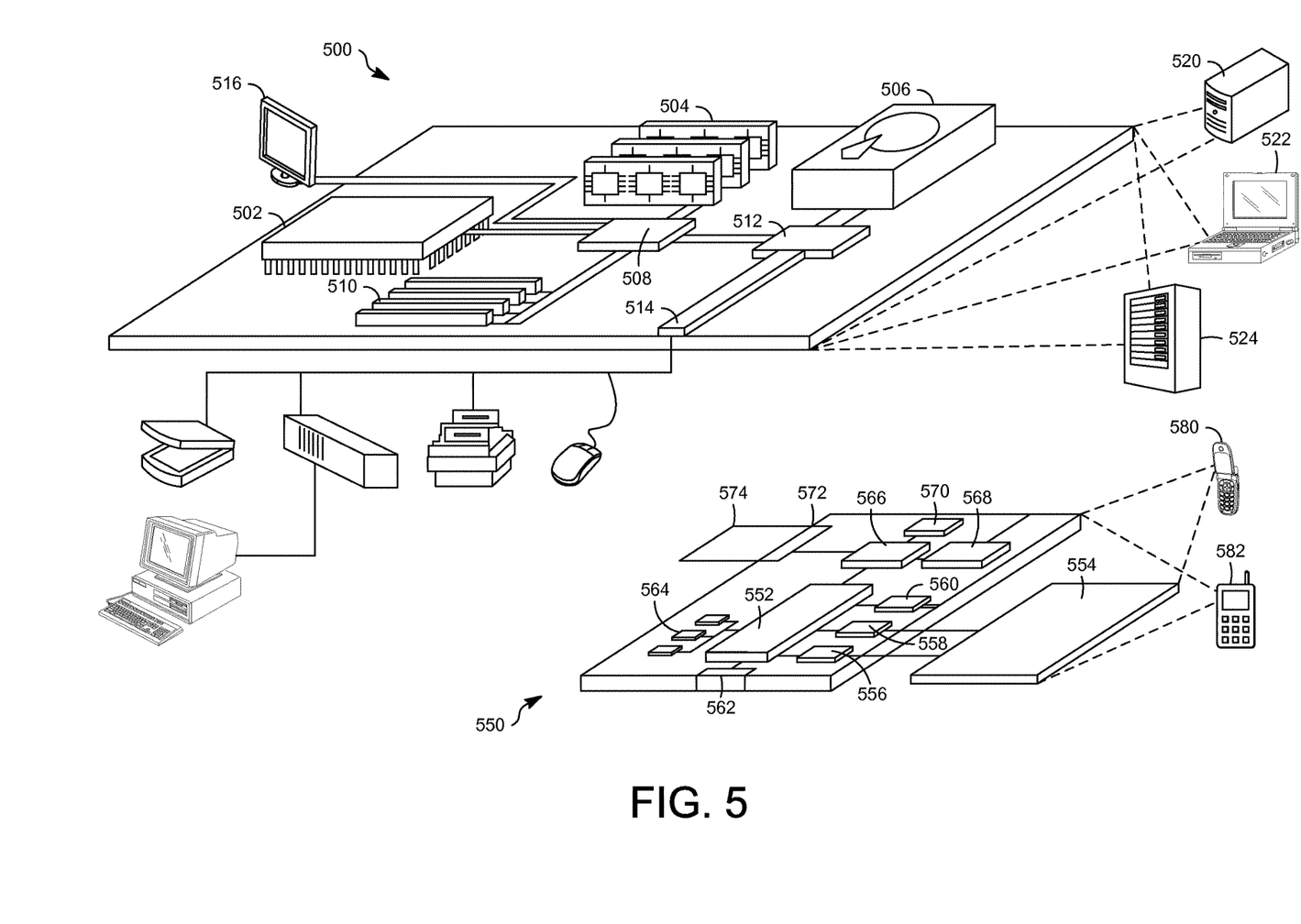
FIG. 5 depicts an example of a computer device and a mobile computer device that can be configured to implement the system and techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also include instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may include one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product includes instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a trackpad or a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus, comprising:
  a memory;
  a processor; and
  a trackpad and a keyboard, wherein the trackpad and the keyboard are combined in a single surface to receive user input comprising multiple different gestures input in different axes in relation to the trackpad and keyboard, wherein the processor is configured to:
    receive and process a typing gesture,
    receive and process a click gesture, receive and process a tracking gesture, and distinguish between processing the received user input as a typing gesture, a click gesture that differs from the typing gesture, and a tracking gesture responsive at least in part to an input axis of the received user input and any movement of the received user input, wherein the received user input is distinguished between the click gesture and the typing gesture responsive at least in part to a measure of force of the received user input compared to a measure of force received over a period of time and stored in the memory and a computing context of the received user input, the received user input is registered as the typing gesture when the measure of the force indicates a typing force and the computing context is a typing context, and the received user input is registered as the click gesture when the measure of force indicates a selection force and the computing context is a selection context.

2. The apparatus of claim 1, wherein the processor is configured to receive and process combinations of different types of gestures.

3. The apparatus of claim 1, wherein the typing gesture comprises a gesture in a Z-axis direction input into the trackpad and the keyboard to input a keystroke.

4. The apparatus of claim 1, wherein the click gesture comprises a gesture in a Z-axis direction input into the trackpad and the keyboard to input a selection input, wherein the selection input differs from a keystroke.

5. The apparatus of claim 1, wherein the tracking gesture comprises a gesture in a X-axis direction and/or a Y-axis direction input on a surface of the trackpad and the keyboard to control cursor movement.

6. The apparatus of claim 1, wherein an entire surface of the trackpad and the keyboard functions to receive gesture input.

7. The apparatus of claim 1, wherein the trackpad and the keyboard comprise:

a top surface including visual representations of individual keys of a keyboard disposed on the top surface; and a sensor layer.

8. The apparatus of claim 7, wherein the visual representations of the individual keys are mapped to corresponding locations on the top surface.

9. The apparatus of claim 7, wherein the sensor layer comprises a capacitive sensor layer.

10. The apparatus of claim 7, wherein the top surface and the sensor layer are a same layer.

11. A method including executing instructions recorded on a non-transitory computer-readable storage media using at least one processor, the method comprising:

obtaining user input to a trackpad and a keyboard, wherein the trackpad and the keyboard are combined in a single surface to receive the user input comprising multiple different gestures input in different axes in relation to the trackpad and keyboard; and distinguishing between processing the received user input as a typing gesture, a click gesture that differs from the typing gesture, and a tracking gesture responsive at least in part to an input axis of the received user input and any movement of the received user input, wherein the received user input is distinguished between the click gesture and the typing gesture responsive at least in part to a measure of force of the received user input compared to a measure of force received over a period of time and stored in a memory and a computing context of the received user input, the received user input is registered as the typing gesture when the measure of the force indicates a typing force and the computing context is a typing context, and the received user input is registered as the click gesture when the measure of force indicates a selection force and the computing context is a selection context.

12. The method of claim 11 further comprising receiving and processing combinations of different types of gestures.

13. The method of claim 11, wherein the typing gesture comprises a gesture in a Z-axis direction input into the trackpad and the keyboard to input a keystroke.

14. The method of claim 11, wherein the click gesture comprises a gesture in a Z-axis direction input into the trackpad and the keyboard to input a selection input, wherein the selection input differs from a keystroke.

15. The method of claim 11, wherein the tracking gesture comprises a gesture in a X-axis direction and/or a Y-axis direction input on a surface of the trackpad and the keyboard to control cursor movement.

16. The method of claim 11, wherein an entire surface of the trackpad and the keyboard functions to receive gesture input.

17. A non-transitory computer-readable storage medium having recorded and stored thereon instructions that, when executed using at least one processor, perform the actions of:

obtaining user input to a trackpad and a keyboard, wherein the trackpad and the keyboard are combined in a single surface to receive the user input comprising multiple different gestures input in different axes in relation to the trackpad and keyboard; and distinguishing between processing the received user input as a typing gesture, a click gesture that differs from the typing gesture, and a tracking gesture responsive at least in part to an input axis of the received user input and any movement of the received user input, wherein the received user input is distinguished between the click gesture and the typing gesture responsive at least in part to a measure of force of the received user input compared to a measure of force received over a period of time and stored in a memory and a computing context of the received user input, the received user input is registered as the typing gesture when the measure of the force indicates a typing force and the computing context is a typing context, and the received user input is registered as the click gesture when the measure of force indicates a selection force and the computing context is a selection context.

18. The non-transitory computer-readable storage medium of claim 17 further comprising instructions that, when executed using the at least one processor, perform the action of receiving and processing combinations of different types of gestures.

19. The non-transitory computer-readable storage medium of claim 17, wherein the typing gesture comprises a gesture in a Z-axis direction input into the trackpad and the keyboard to input a keystroke.

20. The non-transitory computer-readable storage medium of claim 17, wherein the click gesture comprises a gesture in a Z-axis direction input into the trackpad and the keyboard to input a selection input, wherein the selection input differs from a keystroke.

21. The non-transitory computer-readable storage medium of claim 17, wherein the tracking gesture comprises a gesture in a X-axis direction and/or a Y-axis direction input on a surface of the trackpad and the keyboard to control cursor movement.

22. The non-transitory computer-readable storage medium of claim 17, wherein an entire surface of the trackpad and the keyboard functions to receive gesture input.

\* \* \* \* \*